(12) United States Patent
Pellenc et al.

(10) Patent No.: US 7,841,160 B2
(45) Date of Patent: Nov. 30, 2010

(54) SHAKER WITH ADJUSTABLE STIFFNESS FOR HARVESTING MACHINES AND HARVESTING MACHINES USING SUCH SHAKERS

(75) Inventors: Roger Pellenc, Pertuis (FR); Jean-Marc Gialis, Cheval Blanc (FR)

(73) Assignee: Pellenc (Societe Anonyme), Pertuis (FR)

( * ) Notice: Subject to any disclaimer, the term of this patent is extended or adjusted under 35 U.S.C. 154(b) by 0 days.

(21) Appl. No.: 12/510,226

(22) Filed: Jul. 27, 2009

(65) Prior Publication Data

US 2010/0024374 A1 Feb. 4, 2010

(30) Foreign Application Priority Data

Aug. 1, 2008 (FR) .................................. 08 04409

(51) Int. Cl.
*A01D 46/00* (2006.01)
(52) U.S. Cl. ..................................... 56/340.1; 56/328.1
(58) Field of Classification Search ................. 56/328.1, 56/329, 330, 331, 340.1
See application file for complete search history.

(56) References Cited

U.S. PATENT DOCUMENTS 4,924,666 A * 5/1990 Poncet .......................... 56/330

6,155,036 A * 12/2000 Pellenc ....................... 56/328.1

FOREIGN PATENT DOCUMENTS

| FR | 2437769 | 4/1980 |
|----|---------|--------|
| FR | 2509955 | 1/1983 |
| FR | 2554673 | 5/1985 |
| FR | 2605487 | 4/1988 |
| FR | 2638602 | 5/1990 |
| FR | 2639177 | 5/1990 |
| FR | 2651408 | 3/1991 |
| FR | 2668025 | 4/1992 |
| FR | 2768016 | 3/1999 |
| FR | 2789262 | 8/2000 |
| FR | 2813493 | 3/2002 |

* cited by examiner

*Primary Examiner*—Robert E Pezzuto
(74) *Attorney, Agent, or Firm*—Egbert Law Offices PLLC

(57) ABSTRACT

Shaker with adjustable stiffness for harvesting machines, especially grape harvesters, includes two berry detaching assemblies, facing each other. Each assembly includes a plurality of vertically spaced out flexible shakers, having the general shape of a hairpin and two branches connected through a curved portion. The end of one of these branches, the activation branch, connects to an actuation system while the end of the other branches connects to a fixed support. The activation branch is equipped with a mechanism to modify the degree of stiffness or flexibility of the branches over at least a portion of length, and thereby, to adjust the degree of stiffness or flexibility of the shaker assembly.

16 Claims, 11 Drawing Sheets

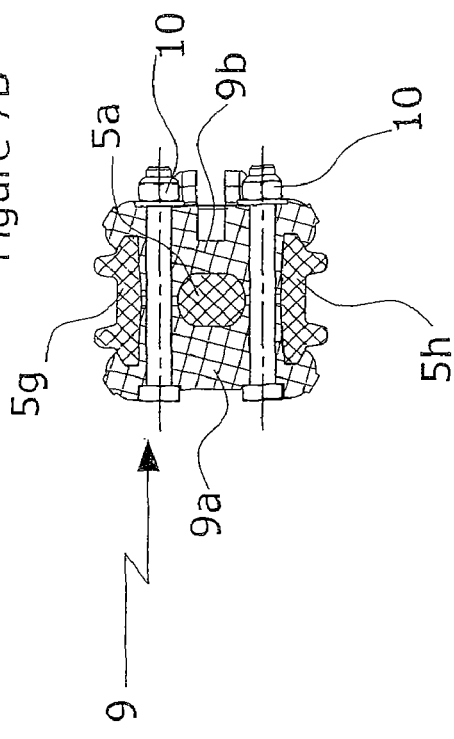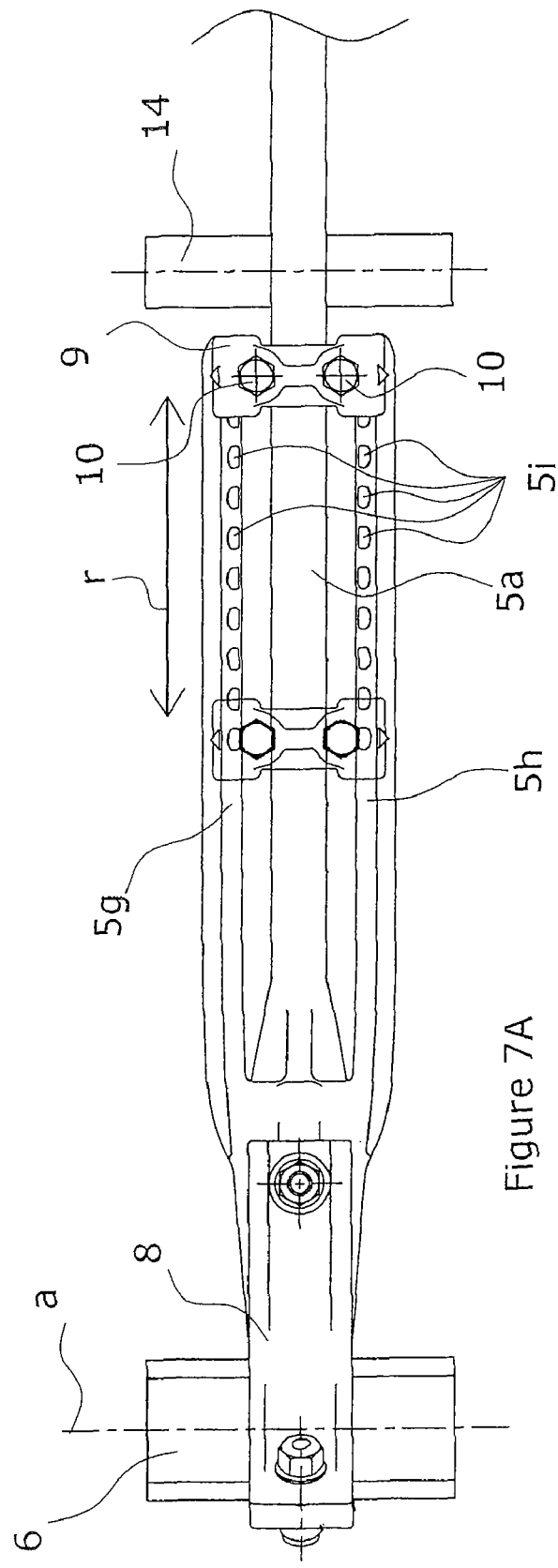

SHAKER WITH ADJUSTABLE STIFFNESS FOR HARVESTING MACHINES AND HARVESTING MACHINES USING SUCH SHAKERS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns a shaker or picking arm with adjustable stiffness for harvesting machines, especially for grape harvesting machines, of the type comprising two berry detaching assemblies placed facing each other and each comprising a plurality of superimposed shakers or picking arms. The invention applies also to harvesting machines and especially to grape harvesting machines of the above-mentioned type using such shakers. It also concerns a disengaging device permitting to neutralize one or more shaker(s) on each of both assemblies of the machine shaking head.

2. Description of Related Art Including Information Disclosed Under 37 CFR 1.97 and 37 CFR 1.98

The world of viticulture is today constantly looking for solutions to improve the various harvesting systems of grape harvesters.

For a few decades, many solutions have been proposed to the wine growers who use mechanical grape harvesting, or to those who used to harvest by hand and became mechanized based on the harvesting quality level achieved with modern grape harvesters.

However, the quality of the grape harvest achieved still remains highly random and depends on several parameters, including human assessment parameters and mechanical performance parameters of the systems that make up the harvesting head of such harvesting machines.

With regard to human parameters, much progress has been made in the ergonomics of the controls for adjustment of the harvesting part of grape harvesters. For the harvesting head adjusting part, three main separate assemblies can be considered: The vine shaking part, the harvest conveying part and the harvest cleaning part. The ergonomic access to the various adjustments of a vine harvester harvesting head enable the vine growers to apprehend much more quickly the adjustments so as to obtain the best quality results for the harvest.

With regard to the mechanical performance parameters, many improvements have been made on the three parts described above, and more specifically on the vine shaking systems.

The vine shaking system is by far the most important part of a grape harvester harvesting head.

It is indeed easy to understand that on a harvesting head, one part of the system is designed to correct any insufficient quality generated by the other systems. For example, the vine cleaning system must be better performing, if the shaking system is under performing, since it generates a lot of leaves and plant debris of all kinds that are to be eliminated.

Several shaking systems for harvesting machines such as grape harvesters are presently known.

The eldest and simplest of these systems uses threshers consisting of simple flexible rods made out of fiberglass and attached at one of their ends onto a shaking arm activated angularly and alternatively by a mechanical crank-rod (see for example FR-2.509.955, FR-2.554.673, FR-2.437.769).

The advantages of this almost completely abandoned system were to be very simple and to be slightly adjustable. Indeed, if one wanted to adjust the fitting, it was possible, but the counterpart was that the amplitude at the end of the thresher decreased significantly, which was not really acceptable as it reduced greatly the travel speed performance of the harvesting machine inside the vine and therefore was of no use.

Furthermore, the very big disadvantage of this thresher system with attachment at only one end of the "threshing" rod was the application to the vegetation of whipping type blows, known as racing phenomenon in the concerned professional environments.

This racing phenomenon results from the relation existing between the thresher stiffness and its specific inertia, leading to a more or less high natural operating frequency that must be, if possible, the farthest from the shaking operating frequencies, and preferably much higher. That was not the case for this type of thresher.

This frequency usually ranges from 450 to 600 strokes per minutes, or from 7.5 to 10 Hz.

Because of its many disadvantages, this system is no longer used today on modern grape harvesters.

At the present time, the most common shaking system uses "shakers" (for example, FR-2.638.602, FR-2.768.016). Such system operates according to the same principles as the previous one, except that it is activated using two shaking arms on each side, with the whole unit having the same type of mechanical crank-rod drive system. The main difference existing between the shaker and the thresher is that the thresher is attached at only one end and that the shaker is attached at both ends because of its general shape as a trombone. This trombone shape gives it an advantage over the older threshing system.

The double attachment indeed enables the system to move while generating a racing phenomenon much less harmful that the one produced by the above-described threshing system.

The stiffness and inertia ratio is indeed much more favorable that the one obtained with the thresher system, which permits to control it better and thus to have a greater adjustment capability, especially with regard to frequency. It is easy to understand that the higher the frequency, the more rigid the shaker must be in order to have a natural frequency higher than the service frequency. Being able to increase the shaking frequencies makes it possible for the grape harvesters equipped with a shaker harvesting system to move much faster than the grape harvesters equipped with a thresher harvesting system.

On some grape harvesters, the shaker systems can be slightly adjustable just like the above-described thresher systems. It is indeed possible, just like on the threshers, to attach both ends of the shaker in a fixing position more or less far from the rotation axis of the shaking shaft so as to modify the bending stiffness. This being said, just like for the threshers, this adjustment has the adverse effect of modifying their amplitude and thus to significantly slow down the machine harvesting speed. This is why many users, even maybe all of them, do not use at all this adjustment capability as it is too difficult to evaluate and to control.

The shaker harvesting system is today conventional and one of the most commonly used on modern grape harvesters.

Another complex shaking system is for example described in FR-2 605 487, FR-2 789 262 and FR-2 813 493 documents.

The shaking system described in these documents comprises shakers consisting of arc-shaped flexible rods whose two ends are connected to a support. A means permits to modify the curvature of these rods.

To that effect, one of the ends of each flexible rod is attached through an articulation to a fixed component of the machine while the opposite end is attached at a mobile point in a direction parallel to the longitudinal axis of the machine through connecting rods or another articulated transmission system.

Such a system is close to a thresher type shaking system, except that at the rear end of the shakers a pivot attachment is provided with a connecting link to support the forward and backward residual movement. The advantage of this rear connecting link attachment is to eliminate the racing disadvantages mentioned above in the thresher type shaking systems. On the other hand, the disadvantage of this system is its great complexity and the fact that it causes the shaker to work under permanent deformation. This permanent deformation makes it necessary to have a very high strength shaker and thus with a greater section than a conventional shaker. Having a shaker with a greater section causes greater inertia in movement. This is why this type of shaking is usually suspended in a pendular manner in the harvesting head.

The disadvantage of this system is that it requires the use of a very large number of mechanical parts, which makes the removal of the shakers more painstaking than on a conventional system.

It is mainly because of the complexity of removal and reinstallation of the shakers that a locking and unlocking system of said shakers was proposed in order to avoid their removal when the number of shakers assembled is greater than necessary based on the height of the fruit-bearing area to be harvested (FR-2 813 493). This locking and unlocking system complicates even further the attachment of the shakers, which does not favor mechanical simplification and smaller inertia of the moving parts, which is the enemy of vibratory systems.

The advantage of the system described in FR-2 605 487, FR-2 789 262 and FR-2 813 493 documents is its power. Because of the number of moving parts and its great inertia, the system has indeed a large kinetic energy reserve, which is an advantage when one wants to move fast and hit hard, especially when the vines are difficult. On the other hand, when the vines are delicate, this advantage becomes a major inconvenient because of the great stiffness of the shakers.

Finally, a shaking device for grape harvesters comprising a plurality of shakers is known. Each one of these shakers consists of a flexible rod folded onto itself by approx. 180° by having the shape of a hairpin, with both branches of the rod having practically the same length, with the end of one of the branches of this rod connected to a drive shaft while the end of the other branch of said rod is connected either to a fixed element of the machine frame (FR-2.639.177), or with a moving capability (FR-2.651.408 and FR-2.668.025) to a support device.

The branch of the shakers that is turned toward the vegetation whenever said shakers are installed in the tunnel of a grape harvester harvesting head, i.e., the branch connected to the drive shaft, is wrapped in a protective sleeve made out of a soft material (FR-2.639.177 and FR-2.651.408).

This soft protective sleeve permits to mitigate the harmful effects generated by the shocks of said shakers onto the fruit and vegetation of the fruit hedges when harvesting. On the other hand, it does not have any impact on the degree of stiffness or flexibility of the shaking rod that remains the same, regardless of whether said shaking rod is coated or not with a soft protective sheath. The soft protective sheath surrounding the shaking rod does not permit to adjust the degree of flexibility or stiffness of this rod. Furthermore, it is mounted in a fixed manner on the shaking rod along which it cannot be moved based on the characteristics of the vines to be processed (vegetation, vine variety, degree de maturity.)

BRIEF SUMMARY OF THE INVENTION

This invention intends to offer solutions to the problems derived from the above-mentioned disadvantages of the various shaking systems available to the users of grape harvesters.

According to a first characteristic arrangement, the harvesting arm or flexible shaker under the invention has the general shape of a hairpin, consisting of two branches connecting through a curved portion, the end of one of those branches or activation branch being designed to be connected to an actuation system, while the end of the other branch making up the active part of the shaker is designed to be attached to a fixed support. Said shaker is more specifically noteworthy in that the activation branch is provided with a device permitting to modify the degree of stiffness or flexibility of the latter over at least a portion of its length, and thus, to adjust the degree of stiffness or flexibility of the shaker assembly.

According to an advantageous embodiment, the device permitting to adjust the stiffness or flexibility of the activation branch on at least one portion of its length, comprises, on one hand, at least one stiffening rod, and preferably, two stiffening rods extending parallel to the latter, starting at a location close to the attachment end of said activation branch, and on the other hand, a mobile mounting device permitting to rigidly connect the stiffening rod(s) to said activation branch, at a variable location of the latter.

According to a preferred embodiment, the stiffening rods are placed respectively above and below the activation branch of the shaker, considering the mounting position of the latter in the harvesting assemblies of the grape harvesters.

The stiffening rod(s) is(are) preferably made out of one single piece with the shaker.

According to an interesting embodiment, the mobile stiffening device consists of a flange mounted with the ability to move along the activation branch and the stiffening rod(s), said flange being made in two parts assembled using clamping components, for example bolts.

It is understood that the invention permits to adjust the stiffness or flexibility of the shakers or harvesting arms of a shaking assembly on harvesting machines, such as grape harvesters, without modifying their activation amplitude, directly on them and without any parts interposed between their activation support (shaking shaft) and the shaker itself.

In addition, it offers the possibility to make precise adjustments of the stiffness or flexibility of the shakers in a simple, rapid and ergonomic manner, without using special tools. The user of the grape harvester is able to easily adapt the shaking system of said machine to all mechanical vine harvesting situations, whether dealing with difficult vines requiring very rigid shakers, or delicate or older vines requiring a much softer stiffness to protect them against too high of a mechanical stress generating leaf and shoot debris of all kinds.

As each shaking assembly of the grape harvesters consists of a plurality of vertically spaced harvesting arms or shakers, it often happens that there are too many of them for the height of the fruit-bearing section of the vine stocks to be harvested depending on the operating mode of the vine parcels so that while harvesting one or more shakers of said assemblies remain inactive while still activated by heir actuation device.

A disengage system for the unused shakers was proposed (FR-2 813 493) in order to prevent having to remove the unused shakers and reinstall them when it becomes desirable, which are time-consuming and arduous operations.

However, the disadvantage of this system of disengaging shakers is that it makes even more complex the shaker attachment system, which does not favor mechanical simplification and smaller inertia of the moving parts, which is the enemy of vibratory systems, as above-mentioned.

Another goal of the invention is to permit to make inactive one or more shakers on each shaking assembly, while they remain attached to the machine harvesting head frame and activated by the shaking shafts of said harvesting head.

For that purpose, the machine harvesting head frame is equipped on both sides of the longitudinal median plane of said harvesting head with neutralization elements permitting to establish a breakable rigid link between said frame and the activation branch of one or more shakers on each shaking assembly.

According to a preferred embodiment, the neutralization element and the stiffness adjusting flange are shaped and arranged so as to allow for their detachable connection using at least one fastening device.

According to an advantageous embodiment, the activation branch of the shaker is equipped with at least one stop pin placed close to the curved portion of said shaker and against which the stiffness adjusting flange can be moved and secured.

According to another advantageous embodiment, the neutralization element is mounted with the ability to pivot on a fixed axis and can be placed in an inactive position under which it is moved away from the shaker or in an active position under which it is connected to the activation branch of said shaker.

It is understood that the invention permits to make inactive one or more shakers on each shaking assembly without having to remove them in the case where the number of shakers attached onto the shaking shafts of the grape harvester proves to be too high in relation to the height of the fruit-bearing section to be harvested.

According to another preferred embodiment, the neutralization element consists of a plate of roughly triangular shape (palm shaped) and the edge of this plate opposite to its mounting axis is provided with a plurality of spaced-out mounting holes placed at variable distances from said mounting axis of the neutralization plate on the shaking assembly frame.

It is understood that this embodiment permits to make inactive the unused shakers with the same device used to adjust the stiffness of each shaker on the harvesting head. It permits to adjust the space provided between the active branches of the shakers made inactive so as to allow for running by the vegetation and palisade posts that may be of different sizes depending on the plantations.

FR-2 768 016 document describes a shaking system consisting of two assemblies facing each other and comprising each a plurality of superimposed harvesting arms or shakers above which a post detecting device is mounted. This device comprises two detection rods mounted facing each other and apart on two fixed elements facing each other on the frame of the shaking system through supports, said supports supporting the front end of said detection rods equipped with shock detectors (for example accelerometers) and attached to said frame through SILENTBLOCS™.

Another goal of the invention is to simplify the mounting of such post detecting device by eliminating the use of specific parts, namely the special detection rods and their special means of attachment onto the frame of the shaking frame.

According to the invention, a shock detector (for example an accelerometer) is mounted at the front end or close to the front end of the active branch of one of the shakers on each shaking assembly, preferably on the upper shaker of each assembly.

The mounting of these shock detectors does not require the use of any special major part dedicated to that function.

The shock detector, for example consisting of an accelerometer is directly positioned on the active branch of the shakers and can efficiently fulfill its function even when the shakers equipped with such detector are not neutralized and therefore mobile.

BRIEF DESCRIPTION OF THE SEVERAL VIEWS OF THE DRAWINGS

The above purposes, characteristics and advantages and many more will become clearer from the description below and the attached drawings.

FIG. 7A is a detailed side elevation view showing two possible stiffness adjustment positions for the connecting flange on the shaker activation branch.

FIG. 7B is a sectional view along line 7-7 from FIG. 7A.

FIGS. 10 and 11 show top plan views of a first adjustment corresponding to a zero opening, FIG. 10 showing the shakers 5 in static situation while FIG. 11 shows said shakers in dynamic situation.

DETAILED DESCRIPTION OF THE INVENTION

Reference is made to said drawings to describe an interesting, although in no way limiting, embodiment of the shaker with adjustable stiffness and of a berry harvesting machine under the invention.

In order not to complicate unnecessarily the invention disclosure, only the shaker with adjustable stiffness and its additional implementation characteristics are shown on the attached drawings and described in detail hereinafter. It is understood that the other parts of the machine using this system (frame, motorization, grave harvest conveyors, receiving bins, etc.) do not fall under this invention and can be executed in the usual manner well known to a person having ordinary skill in the art.

On the other hand, if an especially interesting application of the invention to a harvesting machine, usually designating a grape harvesting machine, is described hereinafter, it is obvious that it is also applicable to other harvesting machines of berries produced by fruit bushes planted in lines, such as, for example: blackcurrant, olive, raspberry, currant, coffee cherry, etc.

It is to be noted that in the description and in the claims the term "stiffness" must be considered as the equivalent of the word "flexibility".

It is also stressed that the use of words such as "upper", "lower", "front", "back", in the description below and in the claims refers to the theoretical position and normal moving direction of the machine, when working.

Figure 1:
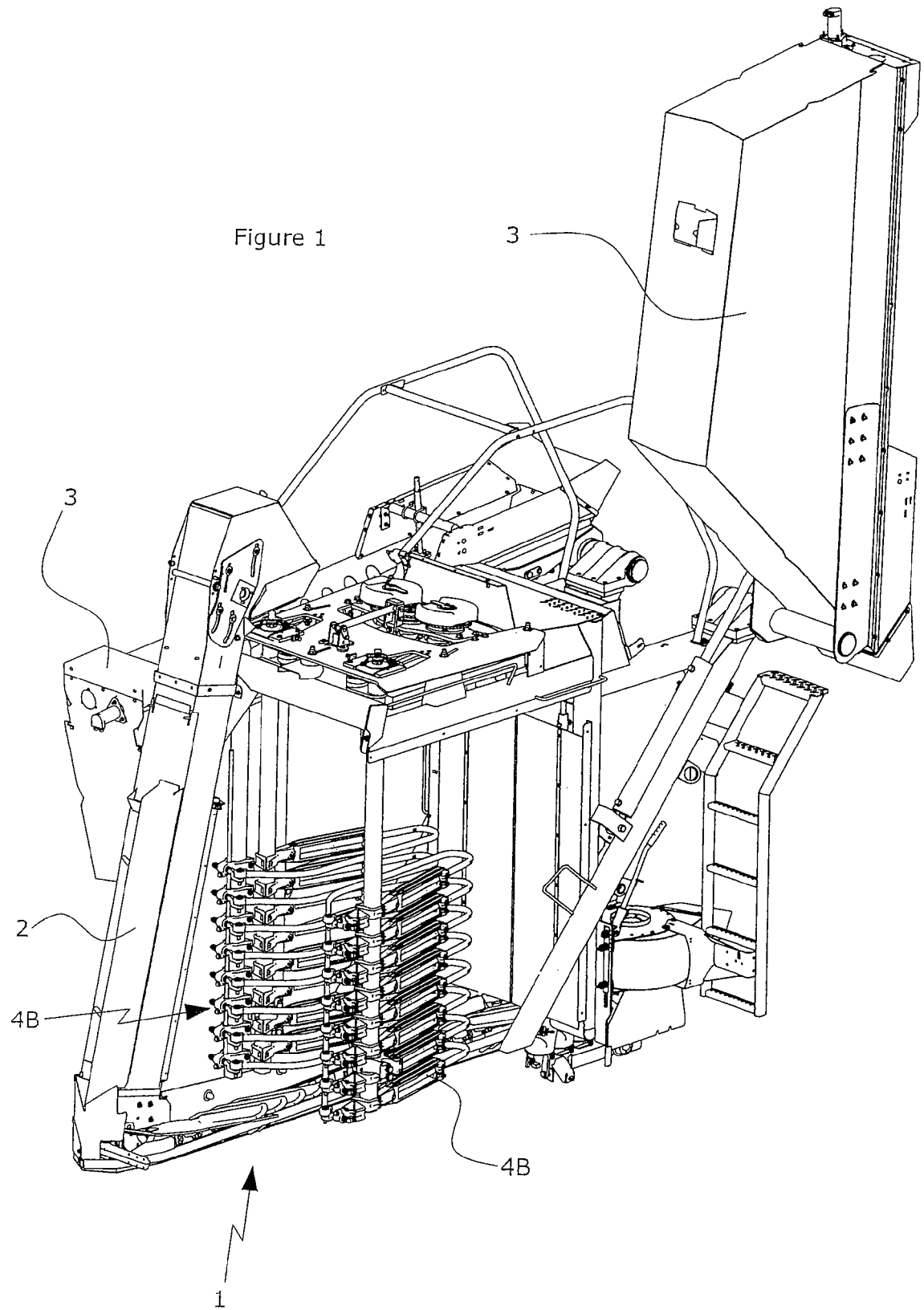
FIG. 1 is a simplified perspective view with partial pull-out of one embodiment of berry harvesting machine to which this invention may apply.

FIG. 1 shows in a simplified manner a grape harvesting machine, comprising, in a known manner, a frame in a gantry shape, a harvesting head 1 carried by said frame and comprising two shaking assemblies facing each other, two conveying systems 2 to receive and transport the harvest up to two receiving bins 3 installed laterally and in the upper part of the frame. The latter is equipped with wheels (not shown) and the machine also comprises a motorization and regulating systems (not shown either), permitting, respectively, to drive and control the operation of its various active components.

The harvesting head 1 is installed, preferably in a removable manner, inside the gantry or tunnel made up by the machine frame.

Figure 2:
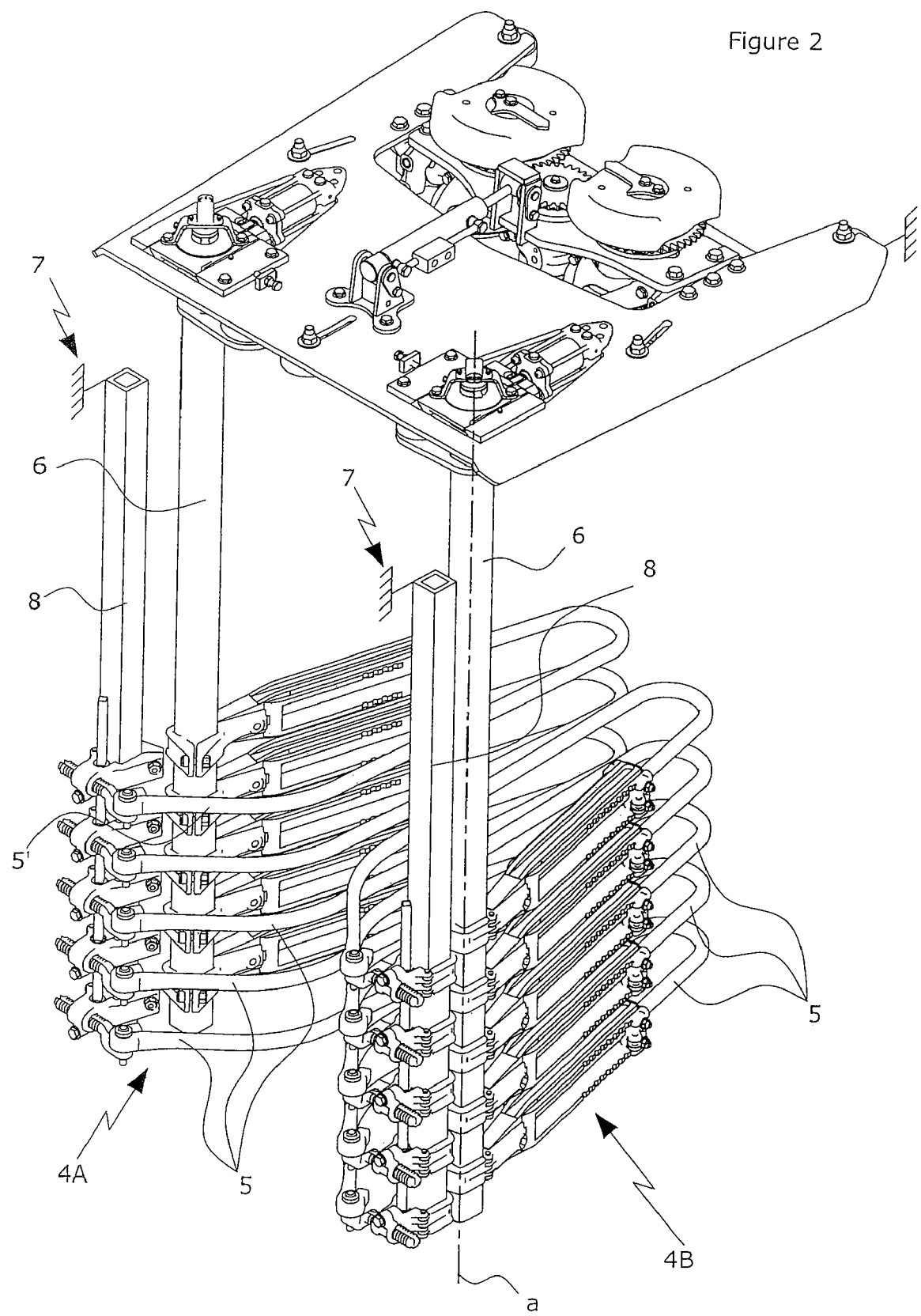
FIG. 2 is a simplified perspective view of the schematic type and at an enlarged scale of a shaking device for a grape harvester comprising shakers with adjustable stiffness under the invention.
Figure 3:
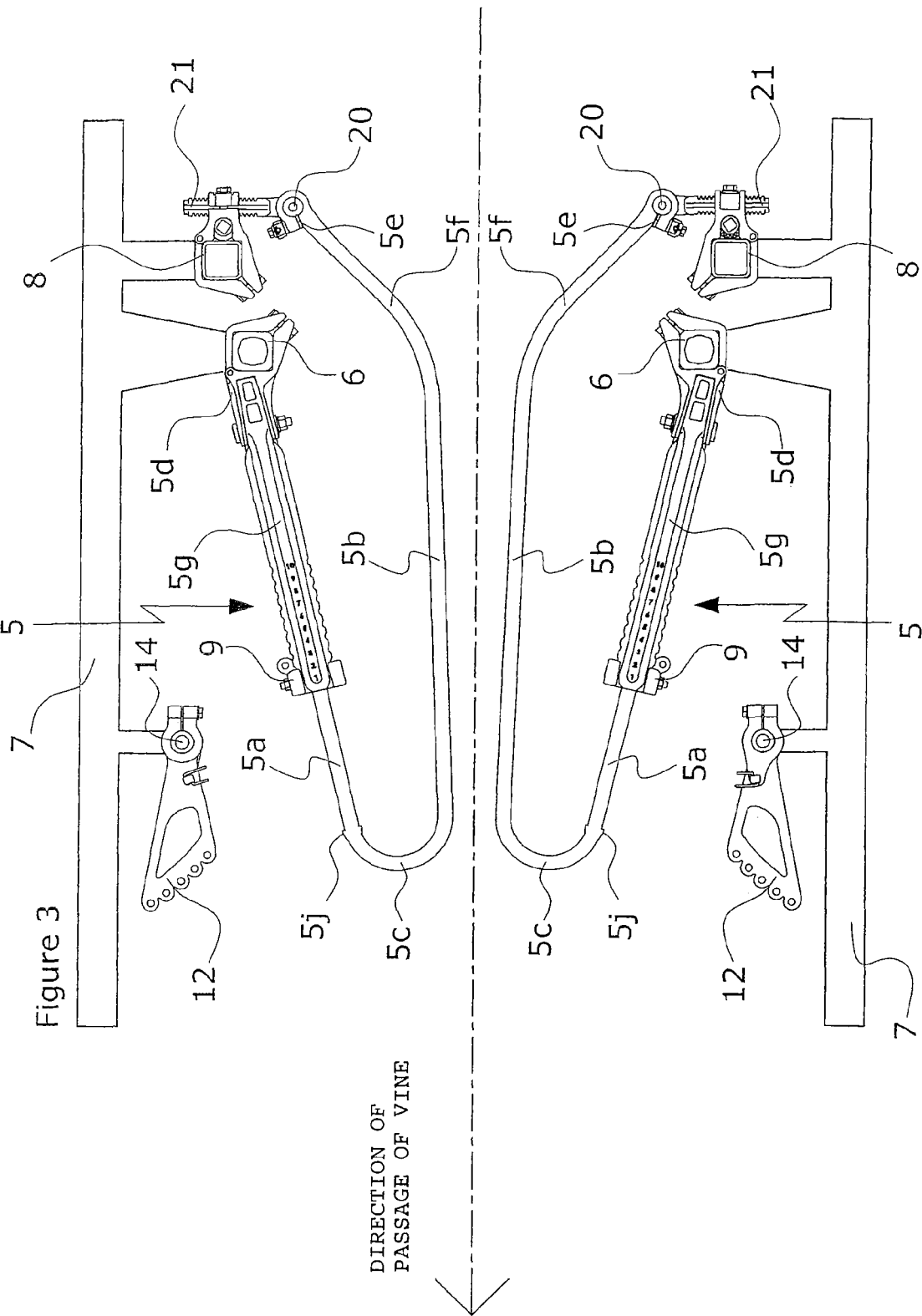
FIG. 3 is a top plan view of the schematic type of a pair of shakers facing each other.
Figure 4:
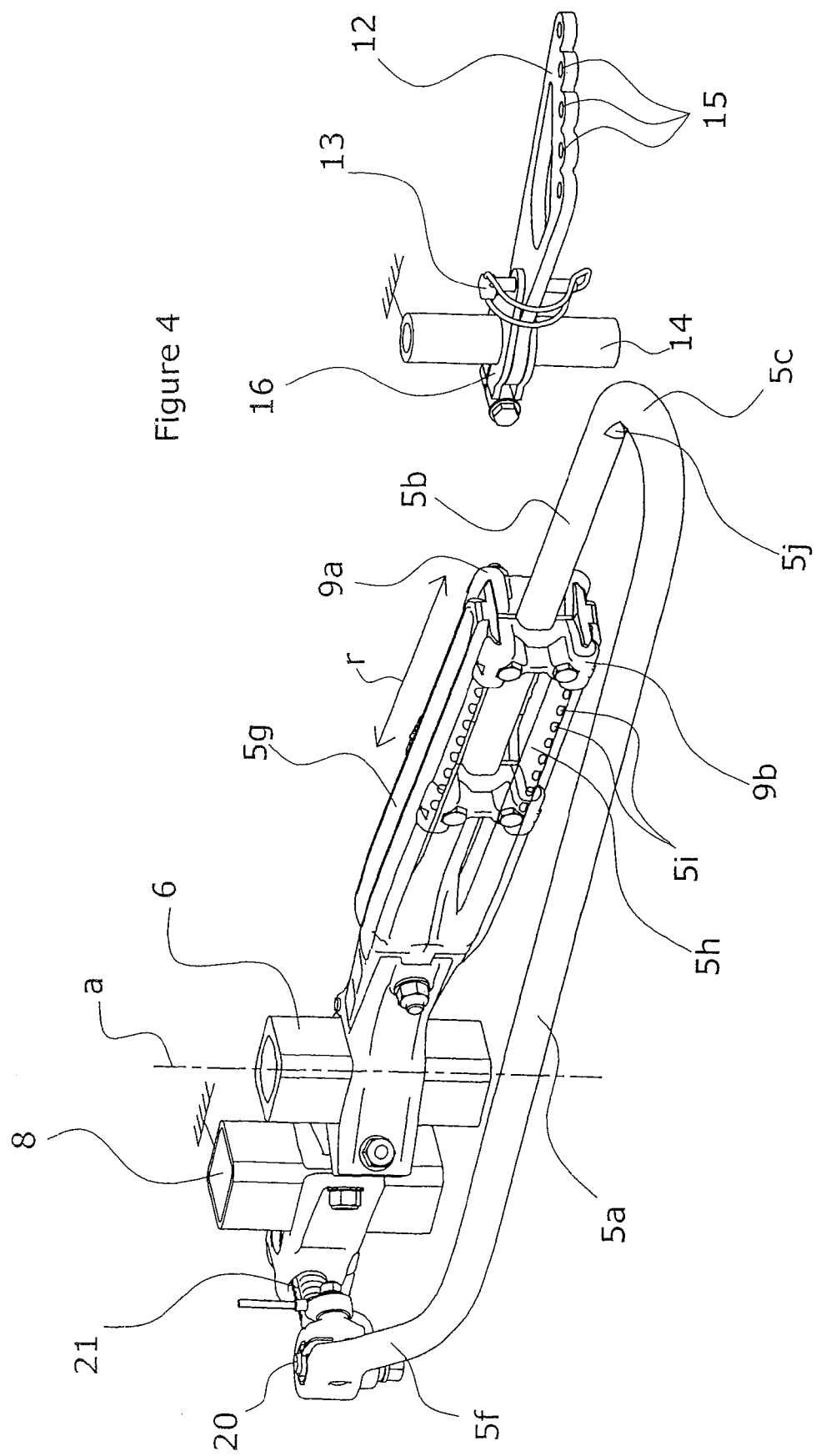
FIG. 4 is an exploded perspective view of a shaker and its neutralization device shown in mounting position on its respective vertical supports.

It basically includes (FIG. 2), a shaking system consisting of two berry detaching assemblies 4A and 4B mounted face to face and each comprising a plurality of superimposed picking or shaking arms 5. These vertically spaced-out shakers consist of flexible bars attached through their ends, on one hand, to a first vertical shaft 6 mounted with a capability of oscillating around its longitudinal axis a, on the frame 7 of the shaking system, and, on the other hand, to a second vertical shaft 8 that is preferably fixed in relation to said frame 7, but that could be installed with motorized oscillation capability or rotating freely. As a general rule, the superimposed shakers 5 on each shaking assembly 4A, 4B are slightly offset vertically in relation to the shakers of the other shaking assembly placed face-to face.

According to a first characteristic arrangement of the invention, the shakers 5 have the general shape of a hairpin consisting of two branches 5a, 5b slightly diverging, connecting through a curved portion 5c, the end 5d of one of these branches, or activation branch 5a being designed to be connected to an actuation system, while the end 5e of the other 5b of said branches making up the active branch of the shaker is designed to be connected to a fixed support. These flexible shakers are made of a semi-rigid material, for example, polyamide or any other material with similar flexibility and bending strength characteristics (for example: polyester, fiberglass, etc.).

The active branch 5b has a length greater than the length of the activation branch 5a and an extreme portion 5f curved in the direction of the y axis of said activation branch.

The activation branch 5a is equipped with a device permitting to modify the length of its flexible portion flexible and thus to adjust the degree of stiffness or flexibility of the shaker assembly. In other words, this device permits stiffening of the activation branch 5a over at least a portion of its length.

According to the advantageous embodiment shown, this means comprises, on one hand, at least a stiffening rod, and preferably two stiffening rods 5g, 5h, extending parallel to the activation branch 5a from a location close to the attachment end 5d of the latter, and on the other hand, a mobile fastening device 9 permitting to rigidly connect said stiffening rod(s) 5g, 5h to said activation branch 5a at a variable location of the latter. Therefore, the activation branch may comprise a rigid portion of variable length extending from its attachment end 5d to the location of the fastening device 9 and a flexible portion of variable length extending from said fastening device 9 to the curved portion 5c of the shaker.

The stiffening rods 5g, 5h preferably have a flat section and are made of one single piece with the shaker itself and these stiffening rods are arranged respectively above or below the flexible portion of the activation branch 5a of the shaker, considering the mounting position of the latter in the shaking assemblies of the grape harvesters.

According to an interesting embodiment, the mobile stiffening component 9 consists of a flange mounted with the ability to move along the activation branch 5a of the stiffening rods 5g, 5h, said flange being made in two parts 9a, 9b assembled using clamping components, for example bolts 10.

The upper stiffening rod 5g may comprise a graduation 11 distributed over its upper face (FIG. 6) and along the same to facilitate adjustments of the stiffness of the shakers to facilitate the stiffness adjustment of the shakers.

In addition, the longitudinal edges of the stiffening rods 5g, 5h are provided with notches 5i to contribute to the foolproof securing of the stiffening flange 9 at the location corresponding to the desired stiffness (FIG. 7).

The shaking system of the grape harvesters under the invention comprise two shaking assemblies facing each other and each comprising a plurality of shakers with adjustable stiffness made in the manner described above and vertically spaced out. Each of these shakers 5 is attached, on one hand, through the end 5d of their activation branch 5a to the vertical actuation shaft 6 of the shaking assembly and, on the other hand, through the end 5e of their active branch 5b to the fixed vertical shaft 8 of said assembly.

According to another characteristic arrangement of the invention, the frame 7 of the machine shaking system is equipped on both sides of its median longitudinal plane with neutralization elements 12 permitting to establish a removable rigid link between said frame 7 and the activation branch 5a of one or more non-neutralized shakers of each assembly in order to make the latter inactive and so that the non-neutralized shakers correspond to the location and height of the vine fruit-bearing section to be harvested.

According to an advantageous embodiment, the temporary link between the neutralization element 12 and the activation branch 5a of the shaker 5 is achieved through the stiffening flange 9. Said element and said flange are shaped and arranged in a complementary manner so as to allow for their detachable link using at least one attachment device, and preferably using one single attachment device such as a pin 13.

The activation branch 5a is equipped with at least one stop pin 5j placed close to the curved portion 5c of the shaker so that the flange 9 can be moved and secured against said pin(s).

Figure 9:
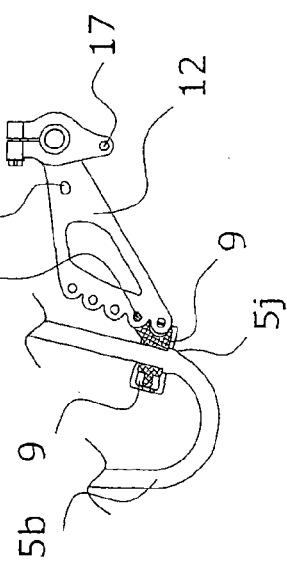
FIG. 9 is a top plan view of this device.
Figure 10:
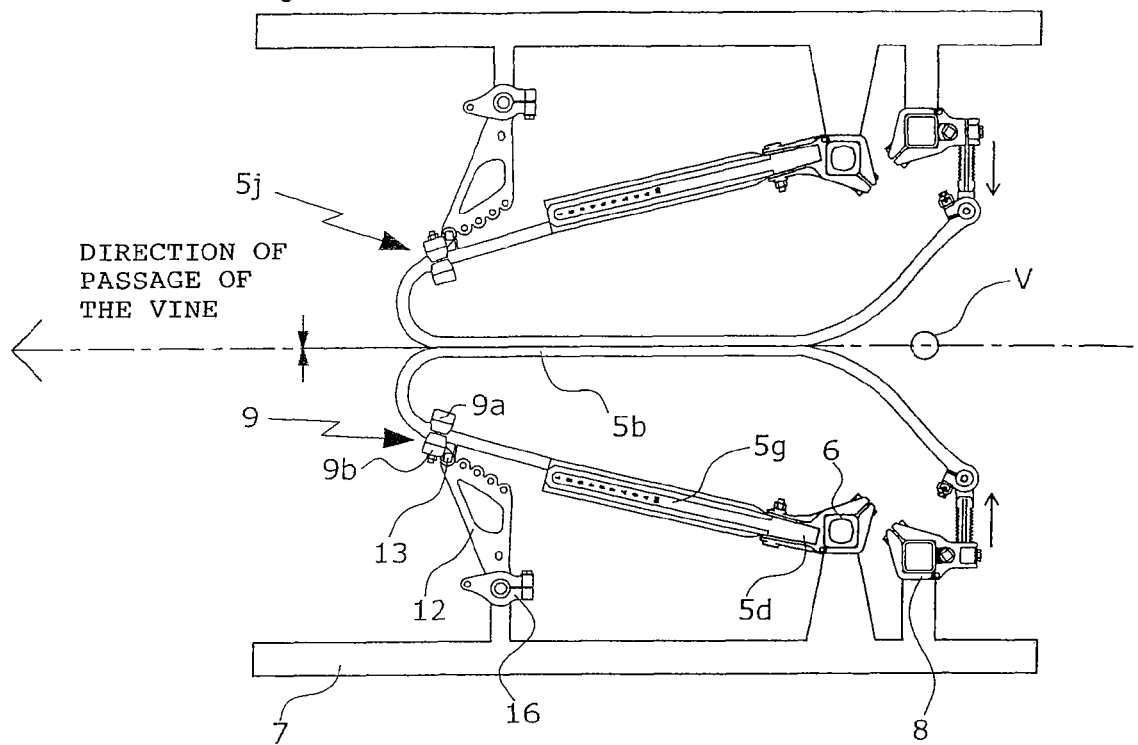
Figure 11:
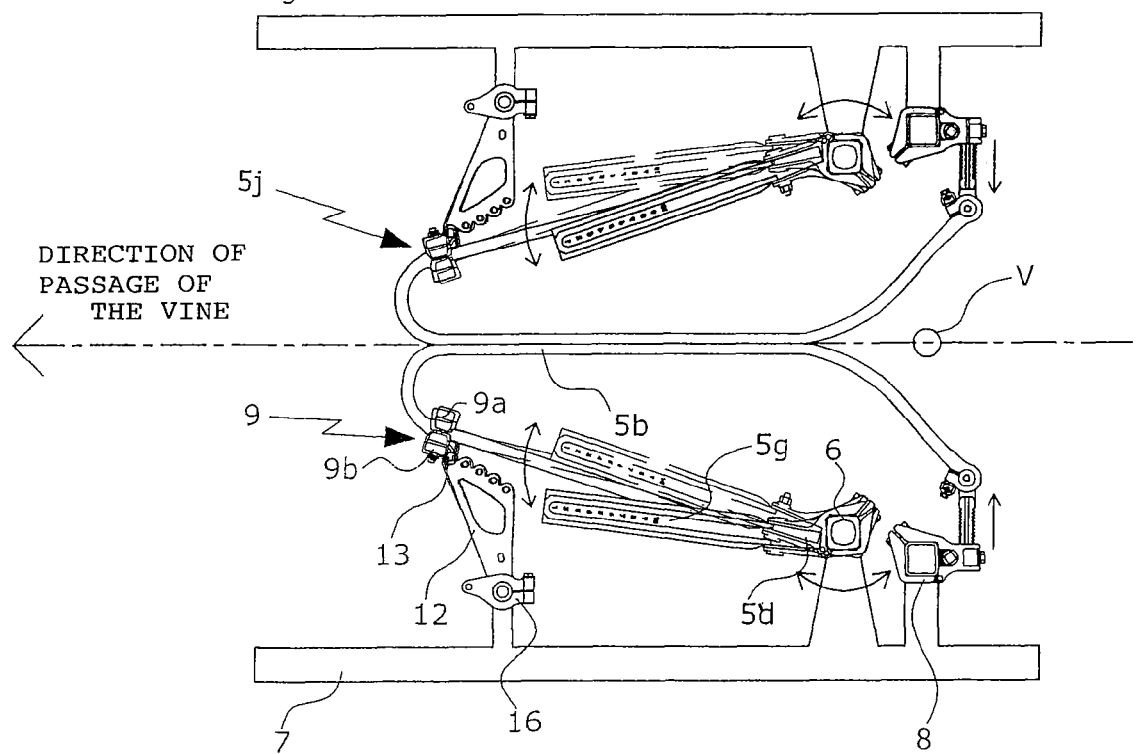
Figure 12:
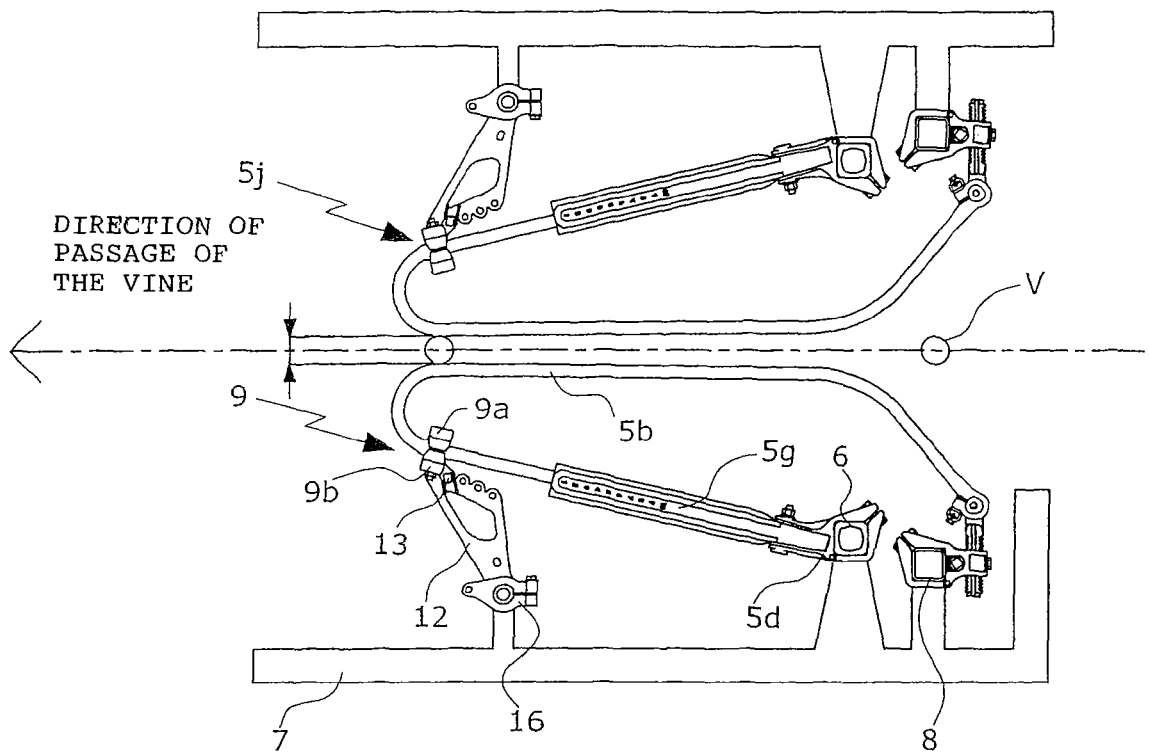
FIGS. 12 and 13 are top plan views similar to FIGS. 10 and 11 respectively, and showing one example of intermediary adjustment corresponding to an average opening permitting to run by vine posts (v) of average size.
Figure 13:
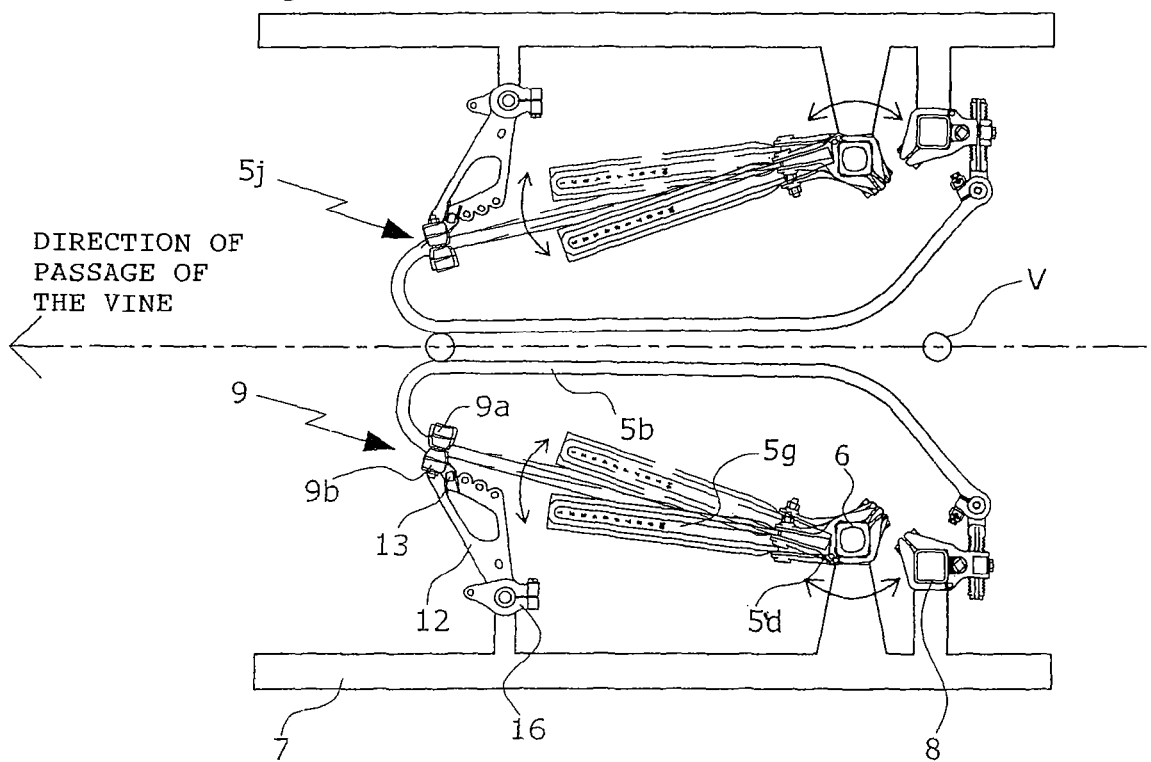
Figure 14:
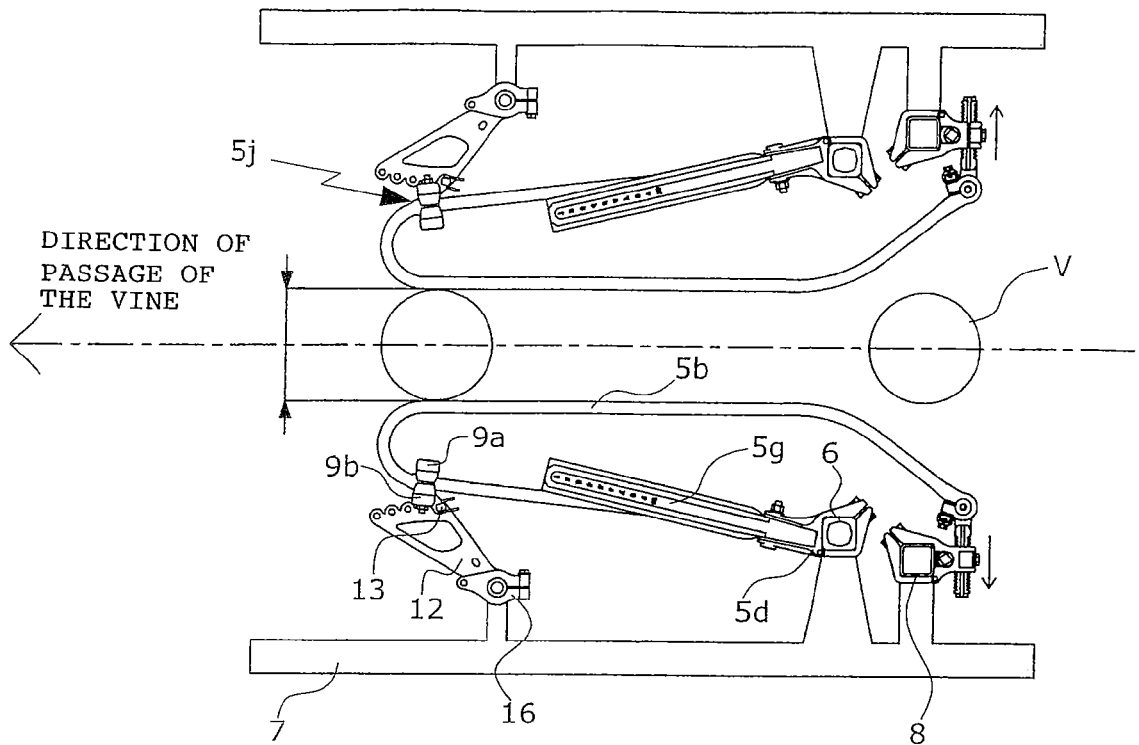
FIGS. 14 and 15 are top plan views similar to FIGS. 10 and 11 respectively, and showing a third adjustment possibility corresponding to a maximum opening permitting to run by vine posts (v) of large size.
Figure 15:
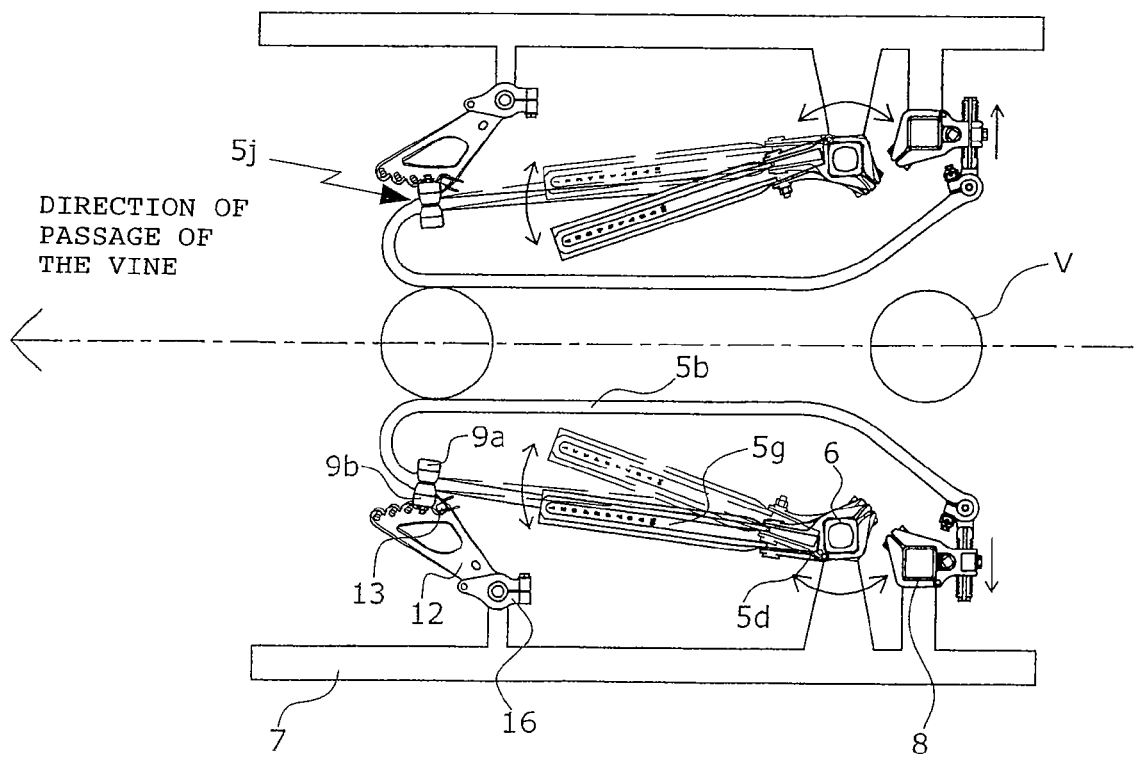

The neutralization element 12 is mounted with the ability to pivot around a fixed vertical axis 14 integral with the frame 7 of the shaking assembly so that it can be placed either in an inactive position under which it is moved away from the shaker 5 (FIG. 5), or in an active position under which it is connected to the activation branch 5a of said shaker (FIGS. 9, 10).

Advantageously, the neutralization element 12 consists of a plate of roughly triangular shape and the edge of this plate opposite to its pivoting axis 14 is provided with a plurality of spaced-out mounting holes 15 placed at variable distances from the mounting axis 14 of said neutralization plate.

Each neutralization plate is secured in the vertical direction using a yoke 16 rigidly attached by clamping onto the mounting axis 14.

Whenever the shaker is in an activity situation, the neutralization element 12 is kept away from said shaker through the pin 13 running through the holes 17 and 18 provided respectively in the yoke 16 and in said neutralization element.

In neutralization position of the shaker 5, the neutralization element 12 is pivoted and connected to the flange 9 through this same pin 13 running through an eyelet 19 provided in each half-portion 9a, 9b of said flange and one of the holes 15 provided in said neutralization element.

According to another characteristic arrangement, a post detector 20 is mounted at the front end or close to the front end 5e of the active branch 5b of one of the shakers on each shaking assembly 4A and 4B, preferably on the upper shaker 5' of each assembly. This post detector may consist of a well-known shock sensor, such as for example an accelerometer. The front end 5e of the active branch 5b of the shaker being attached to the shaft 8 through SILENTBLOCS™ 21 shock absorbers.

Figure 5:
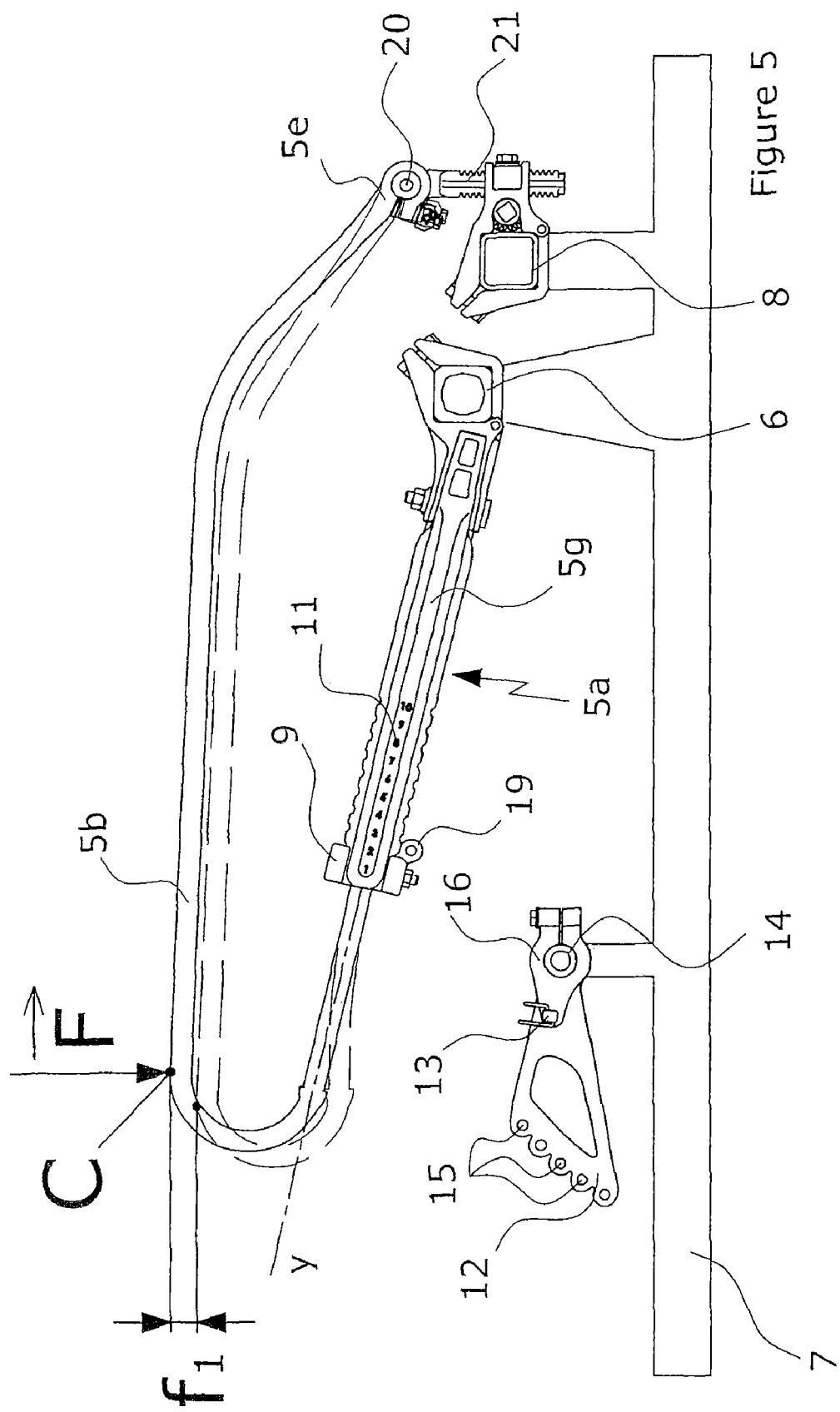
FIGS. 5 and 6 are top plan views showing the modification of the shaker stiffness achieved by implementing the invention.
Figure 6:
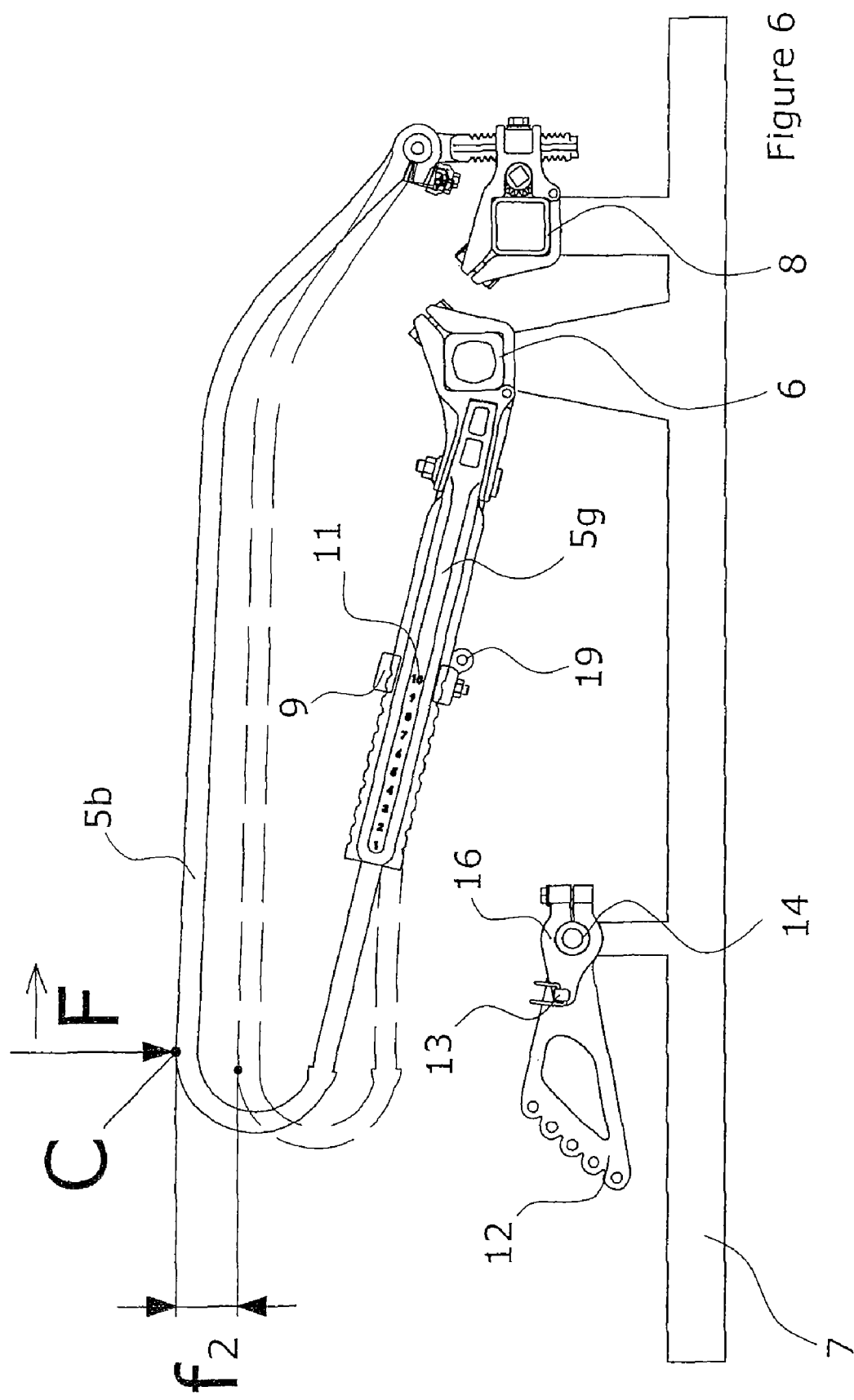
Figure 8:
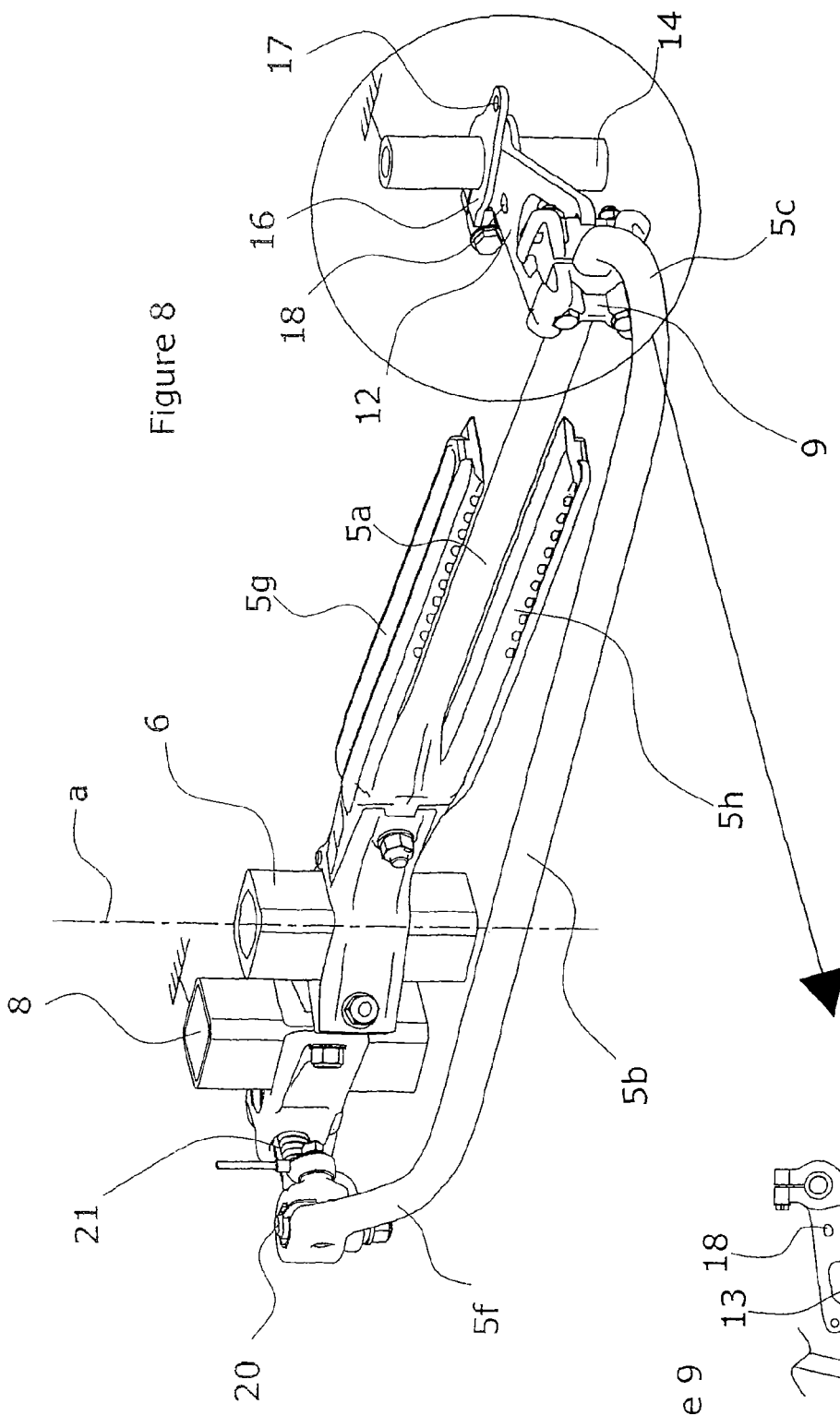
FIG. 8 is a perspective view of a shaker and its neutralization device.

To adjust the stiffness of a shaker, one needs only to unscrew the locking bolts 10 of the stiffening flange 9 so as to enable the two half-flanges 9a, 9b, to slide like a vernier caliper on the stiffening rods 5g, 5h. Bringing the stiffening flange close to the rotation axis of the shaking shaft 6 according to the setting range r artificially lengthens the activation branch 5a of the shaker 5 and thereby makes it more bending flexible (FIGS. 5 and 6).

Whenever the adjustment flange 9 is in the position the farthest from the rotation axis a of the shaking shaft 6 and for example a stress F is applied at a point C of the shaker 5, it causes a bending deflection f1. On the contrary, whenever the stiffness adjustment flange 9 is in the position the closest to the rotation axis a of the shaking shaft 6 and the same stress F is applied at point C of the shaker 5, it causes a bending deflection f2 greater than the previous deflection f1 because the stiffness is less.

To make the shaker 5 inactive, the principle is simple: In the same manner as above, one needs only to unscrew the locking bolts 10 to enable the two half-flanges 9a and 9b to slide along the activation branch 5a and then to reposition said half-flanges outside the area covered by the two stiffening rods 5g, 5h, close to the curved portion 5c of the shaker 5 against the two positioning studs 5j. Once the flange 9 is positioned and secured, the pin 13 connecting the yoke 16 and the neutralization plate 12 is removed and the latter is pivoted and attached to the half-flanges 9A, 9B using this same pin 13. When locking the neutralization plate 12 onto the flange 9, it is possible to choose a position more or less apart between the active area 5b of the left and right shaker. To do so and as above-mentioned, the neutralization plate 12 comprises a plurality of mounting holes 15 allowing for several opening positions between the locked shakers. There are as many possible adjustment positions as there are holes 15 in the plate 12.

After this operation, the neutralized shakers are still activated by the shaking shaft 6, but since the flexible portion of the activation branch 5a is rigidly attached to the frame 7 through the neutralization plate 12, the active branch 5b of said shakers no longer moves.

Consequently, the shakers do not oppose any significant resistance to the shaking shaft 6, which enables the latter to keep fulfilling its activation function for the remaining non-neutralized shakers 5.

Whenever some shakers are neutralized, it is possible to position them according to several openings (FIGS. 10 through 15) so as to let go by the vegetation and the vine posts (v) of various sizes depending on the plantations encountered.

We claim:

1. A shaker apparatus for harvesting machine comprising:
a pair of berry detaching assemblies facing each other, each of said pair of berry detaching assemblies comprising:
a plurality of vertically-spaced shakers each having a hairpin shape, each of said plurality of vertically-spaced shakers having a pair of branches connected through a curved portion, each of said pair of branches having a first end suitable for connection to an actuation system and a second end suitable for connection to a fixed support, said second end being an active part of the shaker, each of said pair of branches having a means for modifying a degree of stiffness or flexibility of the branch over at least a portion of a length of the branch.

2. The shaker apparatus of claim 1, said means for modifying comprising:
at least one stiffening rod extending parallel to the branch and having an end adjacent to said first end of the branch; and
a mobile fastening device rigidly connecting the stiffening rod to the branch away from said first end of the branch.

3. The shaker apparatus of claim 2, the stiffening rod being a pair of stiffening rods positioned respectively above and below the branch.

4. The shaker apparatus of claim 2, the stiffening rod being integrally formed with the shaker.

5. The shaker apparatus of claim 2, said mobile fastening device comprising a flange slidably mounted along the branch, said flange being formed of a pair of parts assembled together with a clamping device.

6. The shaker apparatus of claim 2, the stiffening rod having an upper face with graduations distributed on said upper face.

7. The shaker apparatus of claim 5, the stiffening rod having a longitudinal edge with notches formed thereon, said flange received by at least one of said notches so as to position said flange in a location so as to achieve a desired stiffness of the branch.

8. The shaker apparatus of claim 1, each of said pair of berry detaching assemblies further comprising:
an actuation shaft attached to said first end of the branch; and
a fixed vertical shaft attached to said second end of the branch.

9. The shaker apparatus of claim 8, further comprising:
a frame having a median longitudinal plane, said frame having neutralization elements on opposite sides of said median longitudinal plane, said neutralization elements establishing a removable rigid link between said frame and the branch in order to inactivate the shaker.

10. The shaker apparatus of claim 9, the branch having a flange slidably mounted thereon arranged in a complementary manner to the neutralization element.

11. The shaker apparatus of claim 10, the branch having at least one stop pin positioned adjacent to said curved position of the shaker, said flange positionable against the stop pin.

12. The shaker apparatus of claim 9, the neutralization element being pivotally mounted on a fixed vertical axis so as to be movable between an inactive position away from the shaker and an active position connected to the branch.

13. The shaker apparatus of claim 12, the neutralization element being a plate of generally triangular shape, said plate having an edge opposite to said fixed vertical axis, said edge having a plurality of spaced mounting holes arranged at various distances from said fixed vertical axis.

14. The shaker apparatus of claim 1, further comprising:
a post detector mounted adjacent to a front end of the branch.

15. The shaker apparatus of claim 14, said post detector being mounted on an uppermost shaker of said plurality of vertically-spaced shakers.

16. The shaker apparatus of claim 8, further comprising:
a shock sensor connected to said fixed vertical shaft.

* * * * *